No. 868,137. PATENTED OCT. 15, 1907.
C. S. SHRIVER.
SURGEON'S OPERATING PAN.
APPLICATION FILED OCT. 27, 1906.

Witnesses
Carl Stoughton
Frank G. Campbell

Inventor
Charles S. Shriver
By
Shepherd & Parker
Attorneys

UNITED STATES PATENT OFFICE.

CHARLES S. SHRIVER, OF COLUMBUS, OHIO.

SURGEON'S OPERATING-PAN.

No. 868,137.  Specification of Letters Patent.  Patented Oct. 15, 1907.

Application filed October 27, 1906. Serial No. 340,806.

*To all whom it may concern:*

Be it known that I, CHARLES S. SHRIVER, a citizen of the United States, residing at Columbus, in the county of Franklin and State of Ohio, have invented certain new and useful Improvements in Surgeons' Operating-Pans, of which the following is a specification.

My invention relates to a surgeon's operating pan and has for its object the provision of a device of this character which is adapted to drain blood or other fluids from the body during an operation and constructed in such manner that the parts may be separated for effective sterilization.

Further objects and advantages of the invention will be set forth in the detailed description which now follows.

Figure 1:
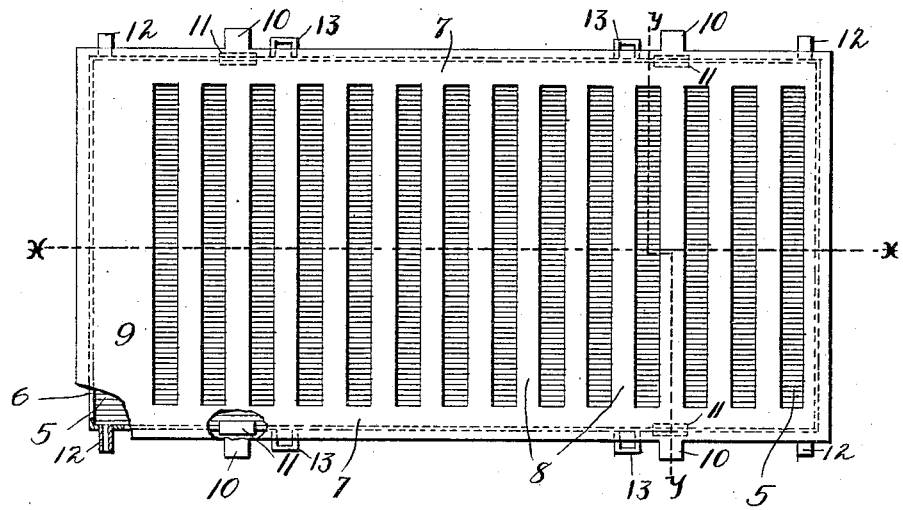
Figure 2:
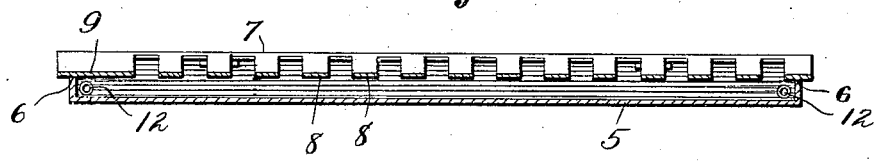
Figure 3:
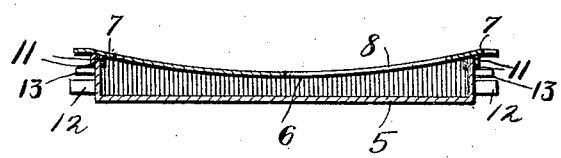
Figure 4:
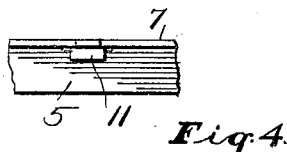
Figure 5:
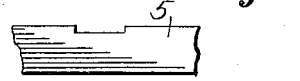

In the accompanying drawing: Figure 1 is a plan view of a device of this character constructed in accordance with the invention, Fig. 2 is a longitudinal vertical section upon line $xx$ of Fig. 1, Fig. 3 is a transverse vertical section upon line $yy$ of Fig. 1, Fig. 4 is a detail view of the connection between the grid and the side of the pan proper, and, Fig. 5 is a detail view of a portion of the side of the pan.

Like numerals designate corresponding parts in all of the figures of the drawing.

Referring to the drawing, the numeral 5 designates a rectangular pan which is preferably metallic, although it may be made of porcelain or it may be metallic and porcelain lined, the material used being such as may be readily and effectively cleansed and sterilized. The end walls of this pan are cut out upon a line indicated at 6, (see Fig. 3) to receive a bowed grid. This grid comprises side members 1 which are connected by a plurality of slats 8, the end slat indicated at 9 being of greater width than the others. Handles 10 are carried by the grid and provide means for lifting the grid from the pan. Upon its underside the grid is provided with a plurality of U-shaped clips 11 which are adapted to engage over the edge of the pan to hold the grid in proper relation to said pan. Drain pipes 12 are located at the corners of the pan and a piece of hose may be attached to these drain pipes to convey the contents of the pan to a bucket or other receptacle. Handles 13 provide means for moving the pan when desired.

The operation of the device is as follows: When in use, the body of the patient rests upon the grid with the broad slat 9 of the grid supporting the back. The blood or other liquid released from the body during the operation, drains through the grid and into the body of the pan, from whence it may be conducted through the outlet pipes 12. This serves to maintain the body of the patient in a dry condition at all times. After an operation has been performed, the grid may be lifted from the pan and the grid and pan separately cleansed and sterilized.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a surgeon's operating pan, the combination with a pan having its end walls partially cut out, of a bowed grid which conforms to the curvature of said end walls and is adapted to receive and support a human body.

2. In a surgeon's operating pan, the combination with a pan having its end walls partially cut out, of a bowed grid which conforms to the curvature of said end walls, and fastening devices adapted to hold said grid upon said pan, said grid being adapted to receive and support a human body.

3. In a surgeon's operating pan, the combination with a shallow rectangular pan, the end walls of which are partially cut out, of a bowed grid which conforms to the curvature of said end walls, and fastening devices carried by the underside of the grid and adapted to hold said grid upon said pan, said grid being adapted to receive and support a human body.

In testimony whereof I affix my signature in presence of two witnesses.

CHARLES S. SHRIVER.

Witnesses:
FRANK G. CAMPBELL,
A. L. PHELPS.